E. LEONARD.
Grass Cultivator-Teeth.
No. 160,444. Patented March 2, 1875.
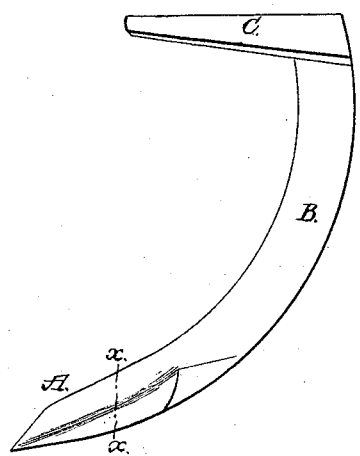
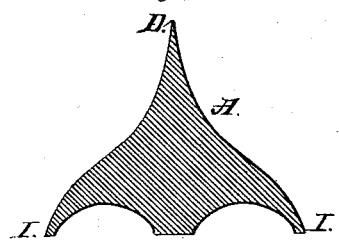

UNITED STATES PATENT OFFICE.

EZRA LEONARD, OF AKRON, OHIO.

IMPROVEMENT IN GRASS-CULTIVATOR TEETH.

Specification forming part of Letters Patent No. 160,444, dated March 2, 1875; application filed December 16, 1874.

*To all whom it may concern:*

Be it known that I, EZRA LEONARD, of Akron, Ohio, have invented a Grass-Cultivator Tooth, of which the following is a specification:

In the cultivation of grass for the renewing of old meadows without the trouble of breaking up the old sward, it is necessary to make the teeth of the grass-cultivator very different from those used in the ordinary cultivation of other crops. The teeth must pass under the sward without much disturbing the surface, thus leaving the ground light and in good condition for the growth of grass. I make the share or point of the tooth very strong, and with two small wings set nearly horizontal, so as to run easily, and also keep in the ground.

My invention consists of a novel construction of cultivator-tooth, with a sharp edge in front, said edge being extended downward and forward nearly to the point of the share, in order to cut upward, and thus allow the share to easily run under tough sward and roots, and cut upward through the sward by a sliding stroke.

My improved grass-cultivator tooth is represented in the accompanying drawings, in which Figure 1 is a side view, Fig. 2 is a front view, and Fig. 3 is a vertical cross-section, of the share.

My improved grass-cultivator tooth may be made of steel, the share, colter, and shank all being cast in one piece, as represented in Fig. 1. The share or point A is set so as to easily enter the ground and keep in the furrow, the sharp upper edge (seen at D, Fig. 3) cutting upward through the sward by an easy sliding stroke. The front edge of the colter B is dressed to a knife-edge by grinding or machine work. The shank C is provided with bolt-holes for fastening the tooth to the frame or drag-bar cultivators having a series of teeth, and yet runs with a light draft for the team.

The share of my improved cultivator-tooth is of peculiar form, being cast very thick, with two wings, I I, and a sharp edge, D, as shown in Fig. 3, which is a section on the line $x\,x$ of Fig. 1. The upper sharp edge D is set at about an angle of thirty degrees above the plane of the ground, so as to give a sliding cut in splitting the tough sward, and thus giving a comparatively easy draft, as none of the earth is dragged or pushed forward.

And my experiments show that old meadows may be easily renewed in grass, and mowed for an indefinite series of years without the expense of plowing, and the cultivation of several other crops to "fit the land for seeding." I propose to use this tooth on my grass-cultivator already patented September 8, 1874.

Having thus fully described my improved grass-cultivator tooth, I claim—

As a new article of manufacture, the above-described cultivator-tooth, consisting essentially of the shank C, the colter B, and the two-winged share H, having the sharp cutting-edge D, curved to run nearly parallel with the surface of the ground, substantially as set forth.

EZRA LEONARD.

Witnesses:
DANIEL BREED,
ANDREW JACKSON.